(12) United States Patent
Hu

(10) Patent No.: US 10,928,688 B2
(45) Date of Patent: Feb. 23, 2021

(54) DISPLAY DEVICE, ELECTRONIC APPARATUS, AND METHOD FOR MANUFACTURING DISPLAY DEVICE

(71) Applicant: Guangdong Oppo Mobile Telecommunications Corp., Ltd., Guangdong (CN)

(72) Inventor: Yanhao Hu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/654,644

(22) Filed: Oct. 16, 2019

(65) Prior Publication Data
US 2020/0050042 A1     Feb. 13, 2020

Related U.S. Application Data

(63) Continuation of application No. PCT/CN2018/082003, filed on Apr. 4, 2018.

(30) Foreign Application Priority Data

Apr. 17, 2017 (CN) .......................... 201710255080.9
Apr. 17, 2017 (CN) .......................... 201720408677.8

(51) Int. Cl.
*G02F 1/1345* (2006.01)
*G02F 1/13357* (2006.01)

(52) U.S. Cl.
CPC .... *G02F 1/13452* (2013.01); *G02F 1/133602* (2013.01)

(58) Field of Classification Search
CPC .................................................. G02F 1/13452
See application file for complete search history.

(56) References Cited

U.S. PATENT DOCUMENTS

2005/0088830 A1* 4/2005 Yumoto ................ H05K 1/147
361/749
2009/0153465 A1* 6/2009 Shinn ................ G02F 1/133308
345/107

(Continued)

FOREIGN PATENT DOCUMENTS

CN    101320142 A    12/2008
CN    102419499 A    4/2012

(Continued)

OTHER PUBLICATIONS

Extended European search report issued in corresponding application No. 18787342.7 dated Jan. 30, 2020.

(Continued)

*Primary Examiner* — Sang V Nguyen

(57) ABSTRACT

A display device, an electronic apparatus, and a method for manufacturing the display device are provided. The display device includes a driving layer and a circuit board. The driving layer is configured to drive the liquid crystals to move so as to change orientation of the liquid crystals. The driving layer includes a first surface facing away from a mainboard of an electronic apparatus having the display device and a second surface facing away from the first surface. The circuit board is partially laminated on the second surface and electrically coupled to the driving layer.

19 Claims, 12 Drawing Sheets

(56) References Cited

U.S. PATENT DOCUMENTS

| | | | |
|---|---|---|---|
| 2011/0090436 A1* | 4/2011 | Choi | G02F 1/136209 |
| | | | 349/106 |
| 2013/0148072 A1* | 6/2013 | Jang | G02F 1/13452 |
| | | | 349/150 |
| 2013/0155349 A1* | 6/2013 | Huang | G02F 1/13452 |
| | | | 349/60 |
| 2013/0328807 A1* | 12/2013 | Matsumoto | G02F 1/134336 |
| | | | 345/173 |
| 2014/0139771 A1 | 5/2014 | Choi | |
| 2014/0168152 A1* | 6/2014 | Ishizaki | G02F 1/13338 |
| | | | 345/174 |
| 2014/0184954 A1* | 7/2014 | Sato | G02F 1/133305 |
| | | | 349/12 |
| 2015/0049257 A1 | 2/2015 | Liu et al. | |
| 2015/0253613 A1* | 9/2015 | Yoon | G02F 1/13452 |
| | | | 349/58 |
| 2016/0170509 A1 | 6/2016 | Notermans | |
| 2017/0208195 A1* | 7/2017 | Yamamoto | G06F 1/1632 |
| 2017/0240728 A1* | 8/2017 | Lee | C09K 11/883 |
| 2018/0129101 A1* | 5/2018 | Kawahira | G02F 1/133345 |
| 2019/0327834 A1* | 10/2019 | Kim | H01Q 1/243 |

FOREIGN PATENT DOCUMENTS

| | | |
|---|---|---|
| CN | 106252380 A | 12/2016 |
| EP | 1936433 A1 | 6/2008 |
| JP | 2004279877 A | 10/2004 |
| KR | 20070063252 A | 6/2007 |

OTHER PUBLICATIONS

International search report issued in corresponding international application No. PCT/CN2018/082003 dated Jul. 11, 2018.

First examination report issued in corresponding IN application No. 201917042642 dated Dec. 2, 2020.

* cited by examiner

DISPLAY DEVICE, ELECTRONIC APPARATUS, AND METHOD FOR MANUFACTURING DISPLAY DEVICE

CROSS-REFERENCE TO RELATED APPLICATION(S)

This application is a continuation of International Application No. PCT/CN2018/082003, filed on Apr. 4, 2018, which claims priorities to Chinese Patent Application No. 201720408677.8, filed on Apr. 17, 2017, and Chinese Patent Application No. 201710255080.9, filed on Apr. 17, 2017, the contents of all of which are hereby incorporated by reference in their entireties.

TECHNICAL FIELD

The present disclosure relates to the technology field of electronic communications, and more particularly to a display device, an electronic apparatus, and a method for manufacturing the display device.

BACKGROUND

At present, display devices of mobile phones include a driving layer for driving liquid crystals to move so as to change orientation of the liquid crystals. At least part of the driving layer and a circuit board overlap with each other, and the driving layer is electrically coupled to a mainboard of the mobile phone via the circuit board. However, in the existing display devices, the circuit board is partially laminated on a side of the driving layer facing a user, and the mainboard of the mobile phone is disposed at a side of the driving layer facing away from the user. As a result, the circuit board is coupled to the mainboard by bypassing the driver layer, and accordingly a length of the circuit board increases, that is, an occupied space of the display device increases, thereby affecting user experience.

SUMMARY

The present disclosure provides a display device, an electronic apparatus, and a method for manufacturing the display device.

An implementation of the present disclosure provides a display device. The display device includes a driving layer and a circuit board. The driving layer is configured to drive liquid crystals to move so as to change orientation of the liquid crystals. The driving layer includes a first surface facing away from a mainboard of an electronic apparatus having the display device and a second surface facing away from the first surface. The circuit board is partially laminated on the second surface and is electrically coupled to the driving layer.

An implementation of the present disclosure provides an electronic apparatus. The electronic apparatus includes a display device and a mainboard. The display device includes a driving layer and a circuit board. The driving layer is configured to drive liquid crystals to move so as to change orientation of the liquid crystals. The driving layer includes a first surface facing away from the mainboard and a second surface facing towards the mainboard. The circuit board is partially laminated on the second surface and is electrically coupled to the driving layer.

An implementation of the present disclosure provides a method for manufacturing the display device. The method includes the following. A driving layer is formed. The driving layer includes a first surface facing away from a mainboard of an electronic apparatus having the display device and a second surface facing away from the first surface. A circuit board is partially laminated on the second surface of the driving layer and electrically coupled to the driving layer.

BRIEF DESCRIPTION OF DRAWINGS

To clearly illustrate the technical solutions of implementations of the present disclosure or of the related art, the following descriptions will briefly illustrate the accompanying drawings described in the implementations or in the related art. Obviously, the accompanying drawings described below merely illustrate some implementations of the present disclosure. Those skilled in the art may obtain other accompanying drawings according to the described accompanying drawings without creative efforts.

DETAILED DESCRIPTION

Figure 1:
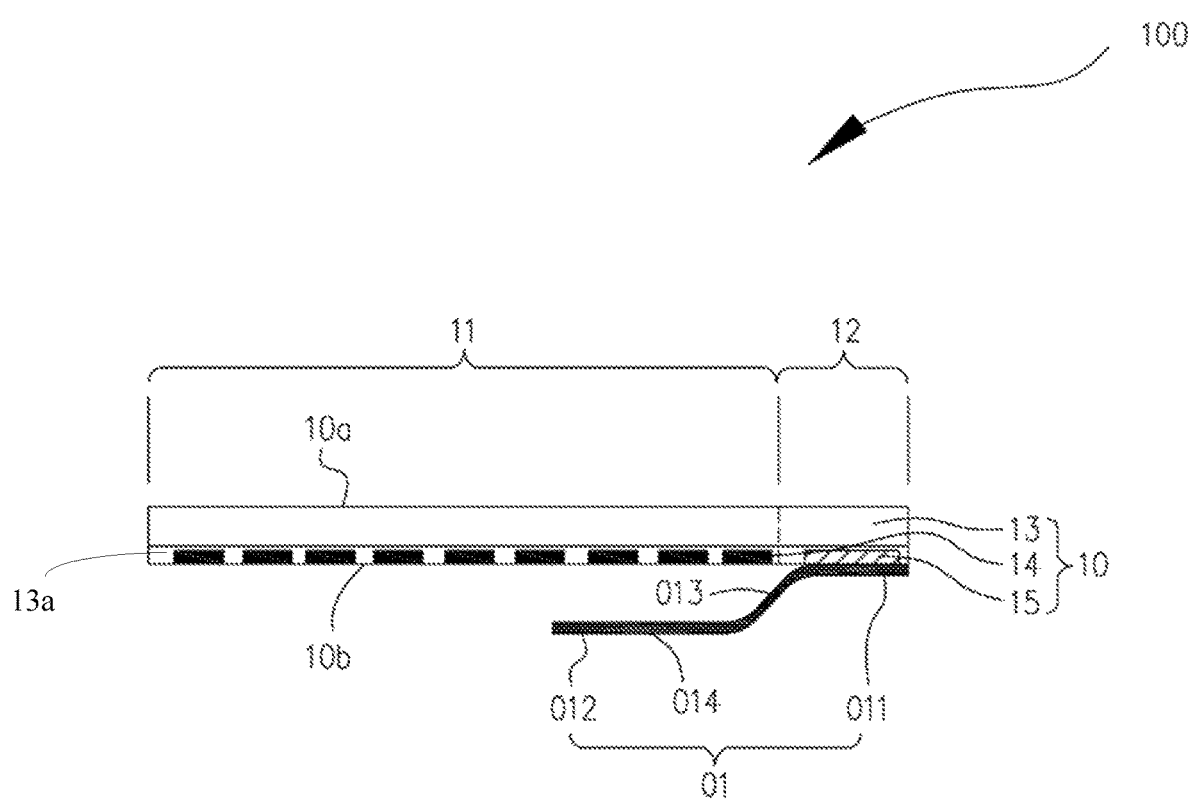
FIG. 1 is a schematic cross-sectional view of a driving layer of a display device according to a first implementation of the present disclosure.

The technical solutions of implementations of the present disclosure will be described clearly and completely in combination with the accompanying drawings of the implementations of the present disclosure. Obviously, the described implementations merely are part of implementations of the present disclosure, rather than all the implementations. All other implementations obtained by those skilled in the art without creative efforts based on the implementations of the present disclosure shall fall within the protection scope of the present disclosure.

A display device includes a driving layer and a circuit board. The driving layer is configured to drive liquid crystals to move so as to change orientation of the liquid crystals. The driving layer includes a first surface facing away from a mainboard of an electronic apparatus having the display device and a second surface facing away from the first surface. The circuit board is partially laminated on the second surface and is electrically coupled to the driving layer.

In one implementation, the driving layer includes a driving substrate and a component layer stacked on the driving substrate. The first surface is a surface of the driving substrate. The second surface is a surface of the component layer. The component layer includes a number of switch components and a number of conductive ports. The switch components are configured to drive the liquid crystals to move so as to change orientation of the liquid crystals and the conductive ports are electrically coupled to the switch components and the circuit board.

In one implementation, the display device further includes a protective layer stacked on the first surface of the driving layer and completely covering the driving layer.

In one implementation, the display device further includes a liquid crystal layer stacked on the second surface of the driving layer facing away from the first surface. The second surface includes an extension portion extending beyond an edge of the liquid crystal layer. The circuit board is partially laminated on the extension portion of the second surface extending beyond the edge of the liquid crystal layer.

In one implementation, the display device further includes a first polarizer fixed between the liquid crystal layer and the driving layer.

In one implementation, the display device further includes a second polarizer fixed to a side of the liquid crystal layer facing away from the first polarizer.

In one implementation, the liquid crystal layer includes two alignment film layers, the liquid crystals disposed between the two alignment film layers, and encapsulating adhesives encapsulating the liquid crystals. The encapsulating adhesives form edges of the liquid crystal layer.

In one implementation, the display device further includes a filter layer stacked on a side of the liquid crystal layer facing away from the driving layer. An orthographic projection of the filter layer falls on the liquid crystal layer.

In one implementation, the filter layer includes a pigment layer stacked on the liquid crystal layer and a filter substrate stacked on a side of the pigment layer facing away from the liquid crystal layer.

In one implementation, the display device further includes a backlight source fixed to a side of the filter layer facing away from the liquid crystal layer. An orthographic projection of the backlight source falls on the filter layer.

In one implementation, the display device further includes a liquid crystal layer stacked on the first surface of the driving layer. The second surface of the driving layer includes an extension portion extending beyond an edge of the liquid crystal layer. The circuit board is partially laminated on the extension portion of the second surface beyond the edge of the liquid crystal layer.

In one implementation, the display device further includes a protective layer, a first polarizer, and a filter layer sequentially stacked on the liquid crystal layer.

In one implementation, the display device further includes a second polarizer and a backlight source, where the second polarizer is stacked on the second surface of the driving layer and the backlight source is stacked on the second polarizer.

In one implementation, the protective layer includes a light transmission substrate and a touch substrate attached to the light transmission substrate. An exit light surface of the protective layer is located at a side of the light transmission substrate facing away from the touch substrate, and an incident light surface of the protective layer is located at a side of the touch substrate facing away from the light transmission substrate.

An electronic apparatus includes a display device and a mainboard. The display device includes a driving layer and a circuit board. The driving layer is configured to drive liquid crystals to move so as to change orientation of the liquid crystals. The driving layer includes a first surface facing away from the mainboard and a second surface facing towards the mainboard. The circuit board is partially laminated on the second surface and is electrically coupled to the driving layer.

In one implementation, the circuit board includes a first extending portion and a second extending portion opposite the first extending portion. The first extending portion of the circuit board is attached to the second surface of the driving layer, and the second extending portion of the circuit board is stacked on the mainboard. The driving layer covers the circuit board.

A method for manufacturing the display device includes the following. A driving layer is formed. The driving layer includes a first surface facing away from a mainboard of an electronic apparatus having the display device and a second surface facing away from the first surface. A circuit board is partially laminated on the second surface of the driving layer and electrically coupled to the circuit board to the driving layer.

In one implementation, a liquid crystal layer is formed on one of the first surface of the driving layer or the second surface of the driving layer.

Figure 2:
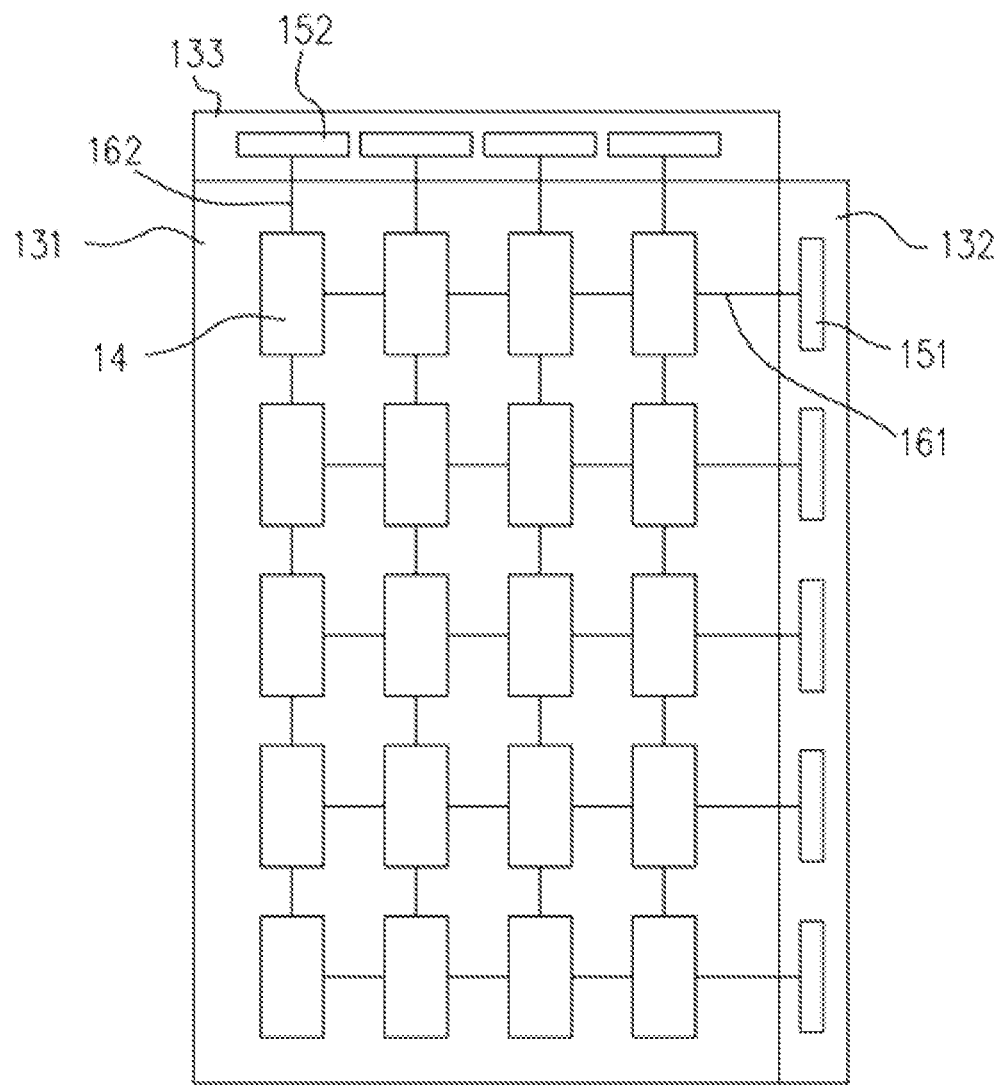
FIG. 2 is a bottom view of the driving layer of the display device illustrated in FIG. 1.
Figure 17:
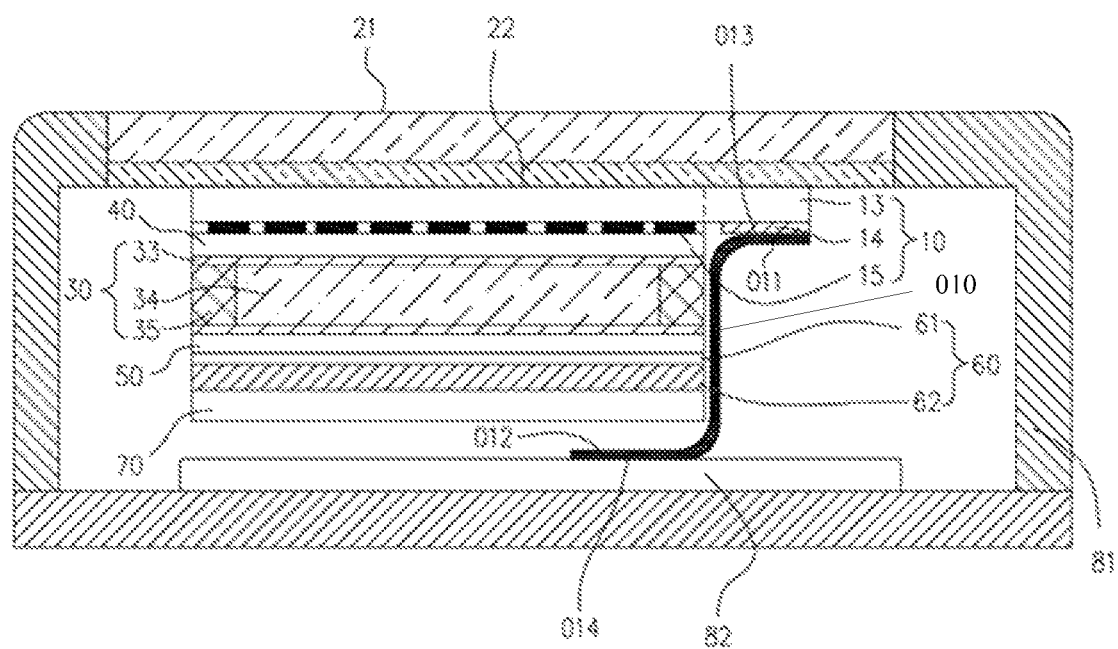
FIG. 17 is a schematic cross-sectional view of an electronic apparatus according to an implementation of the present disclosure.

FIG. 1 and FIG. 2 illustrate a display device 100 according to a first implementation of the present disclosure. The display device 100 includes a driving layer 10 and a circuit board 01. The circuit board 01 is a flexible circuit board. The circuit board 01 includes a main portion 010, a first extending portion 011, and a second extending portion 012 opposite the first extending portion 011, as illustrated in FIG. 17. The first extending portion 011 extends from a first end of the main portion 010 close to the driving layer 10 in a first direction toward a first edge of the driving layer 10. The second extending portion 012 extends from a second end of the main portion 010 opposite to the first end of the main portion 10 in a second direction toward a second edge of the driving layer 10. The first edge is opposite to the second edge. In this implementation, the first edge of the driving layer 10 is a left edge of the driving layer 10 and the second edge of the driving layer 10 is a right edge of the driving layer 10. The driving layer 10 is configured to drive liquid crystals to move so as to change orientation of the liquid crystals. The driving layer 10 includes a first surface 10a facing a user and a second surface 10b facing away from the first surface 10a. The circuit board 01 is partially laminated on the second surface 10b and electrically coupled to the driving layer 10. It should be understood that, the display device 100 may be applied to an electronic apparatus, such as a mobile phone, a tablet computer, or a notebook computer or the like. The display device 100 drives the liquid crystals to move so as to change orientation of the liquid crystals via the driving layer 10. As a result, light emitted from a light source of the display device 100 passes through the liquid crystal to present a pattern or an image.

The circuit board 01 is laminated on the second surface 10b of the driving layer 10, that is, the circuit board 01 is laminated on a side of the driving layer 10 facing away from the display surface of the display device 100, which facilitates an electrical coupling between the circuit board 01 and a mainboard of the electronic apparatus adjacent to the second surface 10b. Accordingly, a volume of the circuit board 01 decreases and an occupied space of the display device decreases, thereby improving the user experience.

In the implementation, the driving layer 10 includes a switch component area 11 and a conductive area 12 connected to a side of the switch component area 11. The switch component area 11 may drive the liquid crystals to move so as to change orientation of the liquid crystals via switch components provided therein. The switch component area 11 may allow light to pass through so that the display device 100 may display images. The conductive area 12 acquires electrical signals via electrical coupling between the conductive area 12 and the circuit board 01. In a case that the display device 100 is applied to the electronic apparatus, the first surface 10a of the driving layer 10 faces the user, that is, faces away from the mainboard of the electronic apparatus. The second surface 10b of the driving layer 10 faces away from the user, that is, faces towards the mainboard of the electronic apparatus. The circuit board 01 is laminated on the second surface 10b. As such, the circuit board 01 does not need to bypass the display device 100 to be electrically coupled to the mainboard of the electronic apparatus, and accordingly the volume of the circuit board 01 decreases. Since the first extending portion 011 of the circuit board 01 is attached to the second surface 10b, the second extending portion 012 of the circuit board 01 may be stacked on the mainboard (illustrated in FIG. 17), and the driving layer 10 may cover the circuit board 01, the circuit board 01 does not include an extension portion extending beyond an edge of the driving layer 10. Accordingly, the display device 100 decreases in length and in width, that is, a non-display area of the display device 100 reduces in size and a display area of the display device 100 increases in size, and accordingly a screen ratio of the display device 100 increases.

Furthermore, the driving layer 10 includes a driving substrate 13 and a component layer 13a stacked on the driving substrate 13. The first surface 10a is a surface of the driving substrate 13 facing away from the component layer 13a and the second surface 10b is a surface of the component layer 13a facing away from the driving substrate 13. The component layer 13a is provided with switch components 14 and conductive ports 15. The switch components 14 are configured to drive the liquid crystals to move so as to change orientation of the liquid crystals. The conductive ports 15 include a number of first conductive ports 151 and a number of second conductive ports 152 electrically coupled to the switch components 14 and the circuit board 01.

In the implementation, the driving substrate 13 is closer to the user or the display surface of the display device than the component layer 13a. The driving substrate 13 includes a switch array portion 131, a first conductive portion 132, and a second conductive portion 133. The switch array portion 131 and the switch component area 11 overlap with each other. The first conductive portion 132 locates at a lateral side of the switch array portion 131. The second conductive portion 132 locates at a longitudinal side of the switch array portion 131. The first conductive portion 132, the second conductive portion 133, and the conductive area 12 overlap with each other. The switch components 14 are arrayed in the switch array portion 131. Each of the switch components 14 is a Thin Film Transistor (TFT). The first conductive ports 151 are disposed in the first conductive portion 132 in a longitudinal direction, corresponding to a number of rows of switch components 14. The second conductive ports 152 are disposed in the second conductive portion 133 in a lateral direction, corresponding to a number of columns of switch components 14. The first conductive ports 151 are fixed to the first conductive portion 132 and the second conductive port 152 are fixed to the second conductive portion 133. The driving layer 10 further includes a number of first data lines 161 and a number of second data lines 162. The first data lines 161 are coupled to the switch components 14 of the driving substrate 13 in the lateral direction. The second data lines 162 are coupled to the switch components 14 of the driving substrate 13 in the longitudinal direction. One end of each of the first data line 161 is electrically coupled to a corresponding first conductive port 151 in the first conductive portion 132. One end of each of the second data lines 162 is electrically coupled to a corresponding second conductive port 152 in the second conductive portion 133. The first conductive ports 151 and the second conductive ports 152 of the driving layer 10 are electrically coupled to the mainboard of the electronic apparatus via the circuit board 01. The first conductive ports 151 and the second conductive ports 152 both are stress sensitive components.

The first extending portion 011 is laminated on a portion of the second surface 10b corresponding to the conductive area 12. The second extending portion 012 is bent relative to the first extending portion 011 and coupled to the mainboard. For example, the circuit board 01 includes a first circuit surface 013 and a second circuit surface 014 opposite the first circuit surface 013. A portion of the first circuit surface 013 corresponding to the first extending portion 011 may be attached to the second surface 10b of the driving layer 10. Pads on the first circuit surface 013 are electrically coupled to the conductive ports 15 of the driving layer 10. When the second extending portion 012 is laminated on the driving layer 10, the second circuit surface 014 faces away from the driving layer 10. The second circuit surface 014 is attached to the mainboard of the electronic apparatus. For example, pads on the second circuit surface 014 are electrically coupled to the mainboard of the electronic apparatus. In other implementations, the circuit board 01 may also be a printed circuit board or rigid-flex printed circuit board.

Figure 3:
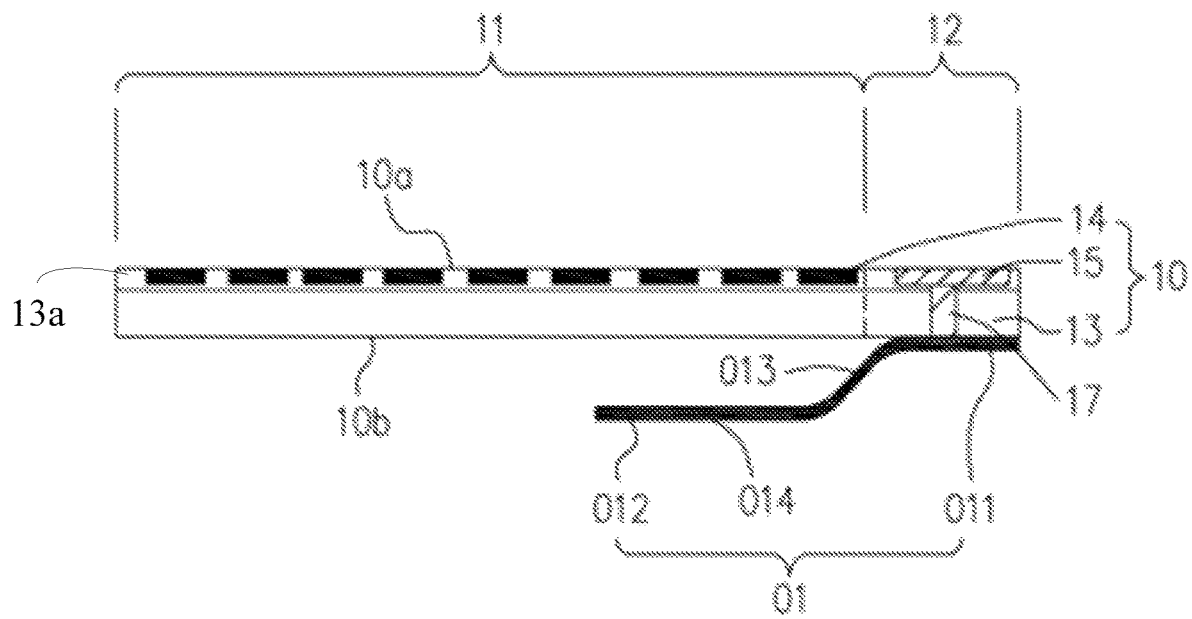
FIG. 3 is a schematic cross-sectional view of the display device according to a second implementation of the present disclosure.

As illustrated in FIG. 3, a display device in a second implementation is similar to that in the first implementation except that the first surface 10a is a surface of the component layer, 13a facing away from the substrate layer 13 and the second surface 10b is a surface of the driving substrate 13 facing away from the component layer 13a. That is, the component layer 13a is closer to the user or the display surface of the display device than the driving substrate 13. The circuit board 01 is laminated on a side of the driving substrate 13 facing away from the component layer 13a. The conductive area 12 of the driving layer 10 is provided with a number of conductive components 17 penetrating the driving substrate 13. One end of each of the conductive components 17 is electrically coupled to a corresponding conductive port 15 of the component layer 13a, and the other end of each of the conductive components 17 is electrically coupled to the circuit board 01.

Figure 4:
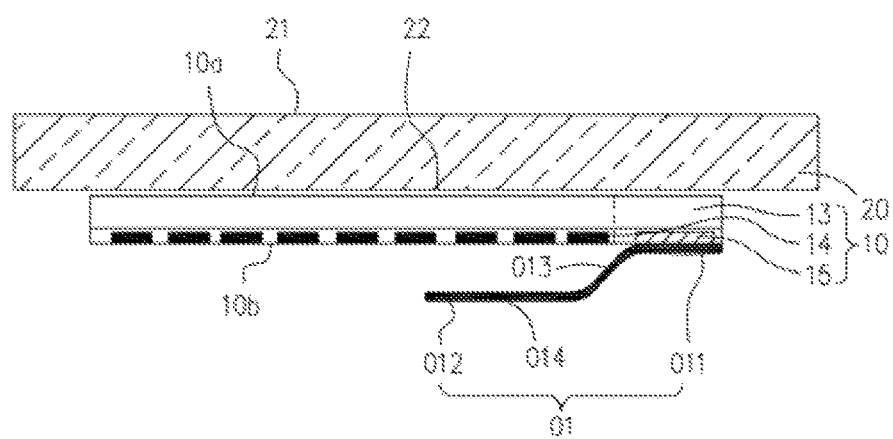
FIG. 4 is a schematic cross-sectional view of the display device according to a third implementation of the present disclosure.

Furthermore, as illustrated in FIG. 4, a display device in a third implementation is similar to that in the first implementation except that the display device in the third implementation further includes a protective layer 20 stacked on the first surface 10a of the driving layer 10 and completely covering the driving layer 10.

In the implementation, the protective layer 20 includes an exit light surface 21 facing the user or the display surface of the display device and an incident light surface 22 facing away from the exit light surface 21. The incident light surface 22 of the protective layer 20 is attached to the first surface 10a of the driving layer 10, with the protective layer 20 completely covering the driving layer 10. That is, the protective layer 20 is attached to the driving substrate 13. The protective layer 20 may allow the light to pass through and protect the driving layer 10. The protective layer 20 covers the switch component area 11 and the conductive area 12. The switch component area 11 and the conductive area 12 of the driving layer 10 both are supported by the protective layer 20 and provided with stress sensitive components. In this way, the stress sensitive components of the driving layer 10 are protected, that is, the driving layer 10 is not easily damaged, thereby increasing the security of the display device. The exit light surface 21 faces the user or the display surface of the display device, that is, the light of the display device exits the protective layer 20 from the exit light surface 21. The incident light surface 22 faces away from the user or the display surface of the display device, that is, the light of the display device reaches the protective layer 20 from the incident light surface 22. The protective layer 20 supports the first conductive portion 132 and the second conductive portion 133, thereby ensuring the security of the first conductive ports 151 and the second conductive ports 152, that is, ensuring the reliability of the driving layer 10. Since the incident light surface 22 of the protective layer 20 is attached to the driving layer 10, the protective layer 20 completely covers the driving layer 10 to reinforce the driving layer 10. As a result, the driving layer 10 is supported and is not easily broken, thereby ensuring the structure of the display device to be stable and reliable.

Figure 5:
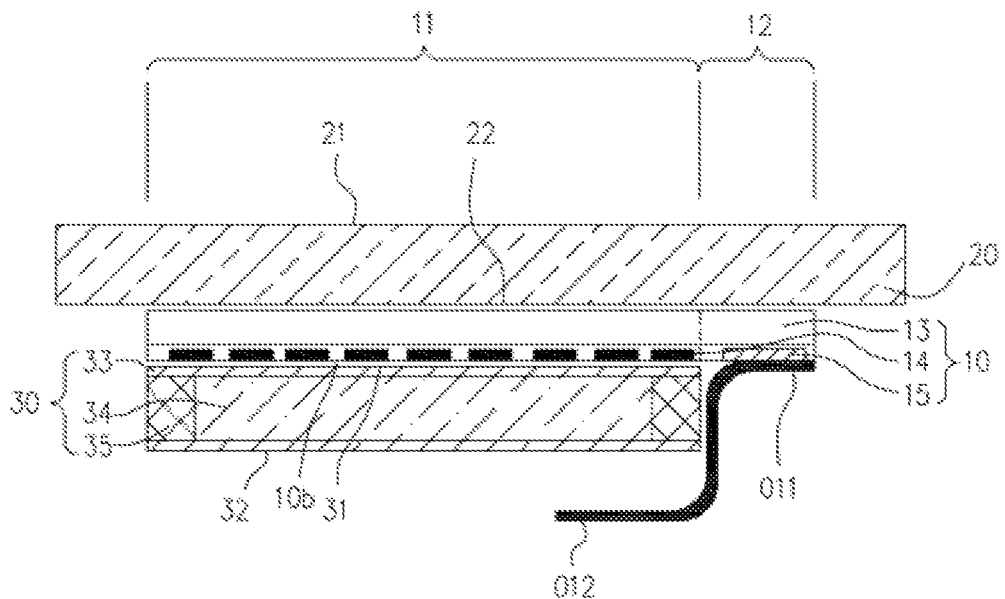
FIG. 5 is a schematic cross-sectional view of the display device according to a fourth implementation of the present disclosure.

Furthermore, as illustrated in FIG. 5, a display device in a fourth implementation is similar to that in the third implementation except that the display device in the fourth implementation further includes a liquid crystal layer 30 stacked on a side of the driving layer 10 facing away from the first surface 10a, that is, the second surface 10b of the driving layer 10. The second surface 10b includes an extension portion extending beyond an edge of the liquid crystal layer 30. The circuit board 01 is partially laminated on the extension portion of the second surface 10b extending beyond the edge of the liquid crystal layer 30.

In the implementation, the liquid crystal layer 30 selects to allow the light to pass through or block the light via changing orientation of the liquid crystals, thereby displaying various patterns or images on the liquid crystal layer 30. An orthographic projection of the liquid crystal layer 30 falls on the switch component area 11 of on the driving layer 10. The switch components 14 in the switch component area 11 drive the liquid crystals of the liquid crystal layer 30 to move so as to change orientation of the liquid crystals. The conductive area 12 forms the extension portion of the driving layer 10 extending beyond the edge of the liquid crystal layer 30. The liquid crystal layer 30 includes a first surface 31 and a second surface 32 opposite the first surface 31. The first surface 31 is laminated on the driving layer 10. The light source of the display device is adjacent to the second surface 32 of the liquid crystal layer 30. The light emitted from the light source of the display device reaches the first surface 31 from the second surface 32, and the patterns or images are displayed on the first surface 31. The liquid crystal layer 30 includes two alignment film layers 33, liquid crystals 34 disposed between the two alignment film layers 33, and encapsulating adhesives 35 encapsulating the liquid crystals 34. The encapsulating adhesives 35 form edges of the liquid crystal layer 30. The encapsulating adhesives 35 and the two alignment film layers 33 cooperatively form a liquid crystal cell, and the liquid crystals 34 are filled in the liquid crystal cell. The conductive area 12 of the driving layer 10 extends beyond the liquid crystal layer 30.

Figure 6:
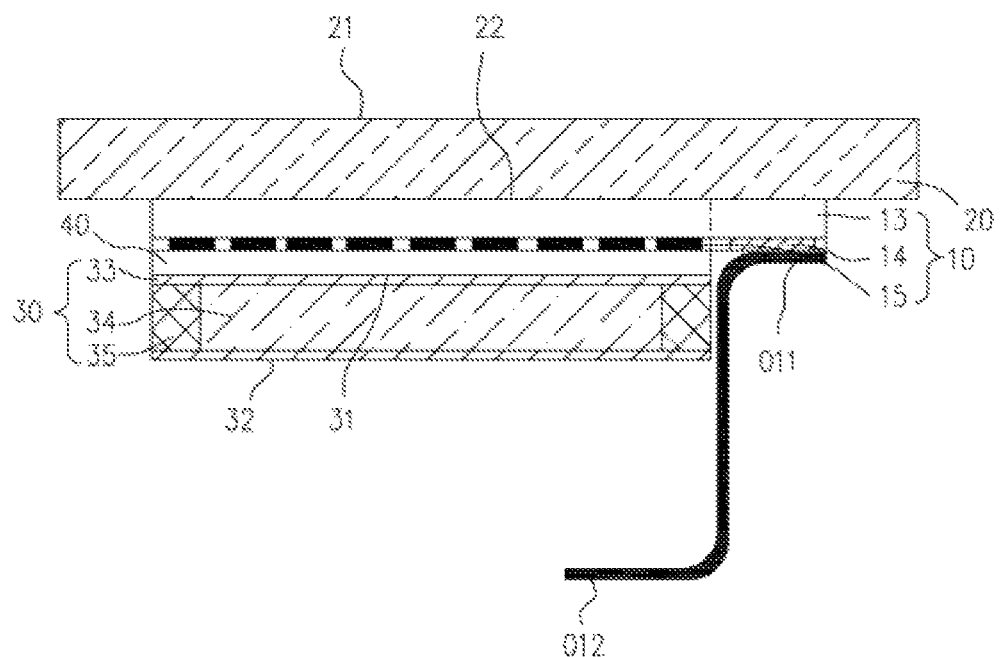
FIG. 6 is a schematic cross-sectional view of the display device according to a fifth implementation of the present disclosure.

Furthermore, as illustrated in FIG. 6, in a fifth implementation, a display device further includes a first polarizer 40 fixed between the liquid crystal layer 30 and the driving layer 10.

In the implementation, the first polarizer 40 enables light transmitting through the liquid crystal layer 30 to be polarized, such that the light transmitting through the first polarizer 40 forms an image viewable for the user. An orthographic projection of the first polarizer 40 falls on the switch component area 11 of the driving layer 10. That is, the driving layer 10 has the extension portion extending beyond an edge of the first polarizer 40.

Figure 7:
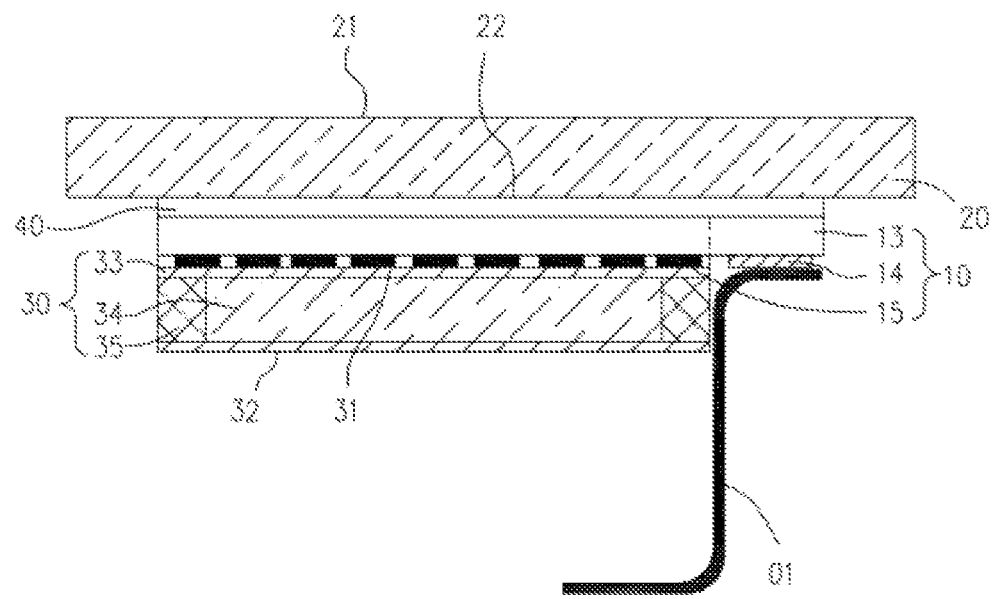
FIG. 7 is a schematic cross-sectional view of the display device according to a sixth implementation of the present disclosure.

As illustrated in FIG. 7, a display device in a sixth implementation is similar to that in the fifth implementation except that the first polarizer 40 is stacked between the protective layer 20 and the driving layer 10. The first polarizer 40 covers the driving layer 10, and the first polarizer 40 supports the extension portion of the driving layer 10 extending beyond the edge of the liquid crystal layer 30. The driving layer 10 is attached to the protective layer 20 via the first polarizer 40, thereby enhancing the structural stability of the display device.

Figure 8:
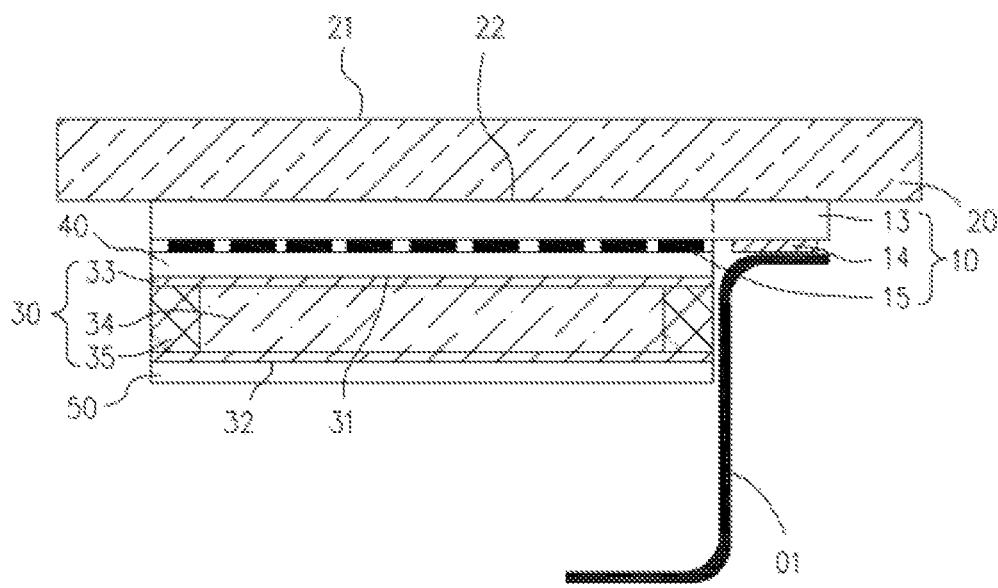
FIG. 8 is a schematic cross-sectional view of the display device according to a seventh implementation of the present disclosure.

As illustrated in FIG. 8, a display device in a seventh implementation is similar to that in the sixth implementation except that the display device in the seventh implementation further includes a second polarizer 50 fixed on the side of the liquid crystal layer 30 facing away from the driving layer 10.

In the implementation, the second polarizer 50 enables the light of the light source of the display device to be polarized, and the light polarized reaches the liquid crystal layer 30 and may be processed by the liquid crystal layer 30. An orthographic projection of the second polarizer 50 falls on the liquid crystal layer 30.

Figure 9:
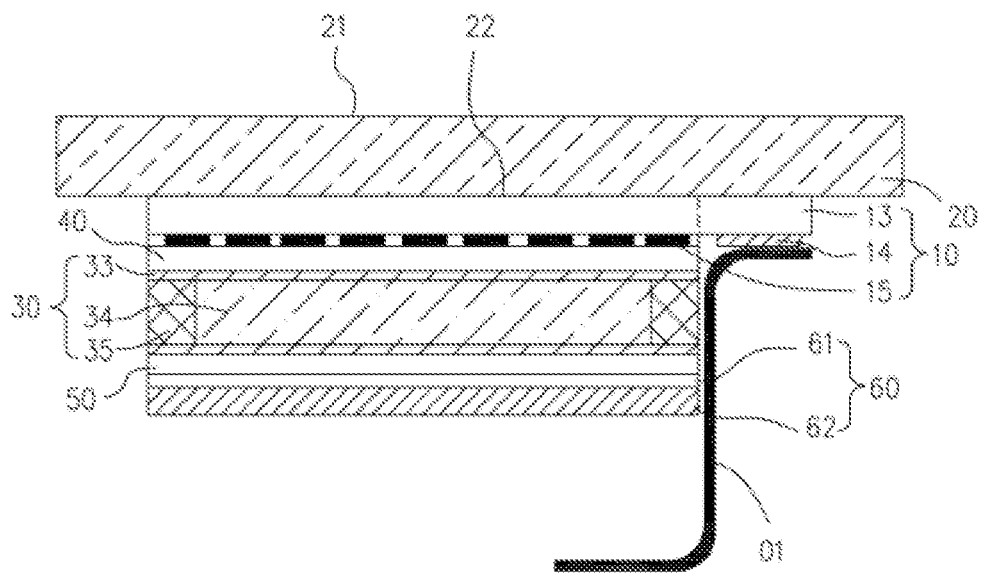
FIG. 9 is a schematic cross-sectional view of the display device according to an eighth implementation of the present disclosure.

Furthermore, as illustrated in FIG. 9, a display device in an eighth implementation is similar to that in the seventh implementation except that the display device in the eighth implementation further includes a filter layer 60 stacked on a side of the second polarizer 50 facing away from the driving layer 10. An orthographic projection of the filter layer 60 falls on the liquid crystal layer 30.

In the implementation, after the filter layer 60 filters the light emitted from the light source of the display device, a color light is formed and reaches the liquid crystal layer 30. The filter layer 60 includes a pigment layer 61 stacked on the a side of the second polarizer 50 facing away from the liquid crystal layer 30 and a filter substrate 62 laminated on a side of the pigment layer 61 facing away from the liquid crystal layer. The pigment layer 61 includes a number of pixels. Each pixel is consisted of at least two sub-pixels. Each pixel corresponds to one of the switch components 14 of the driving layer 10. The filter substrate 62 is a color filter (CF) substrate. The light emitted from the light source of the display device sequentially passes through the filter substrate 62 and the pigment layer 61.

Figure 10:
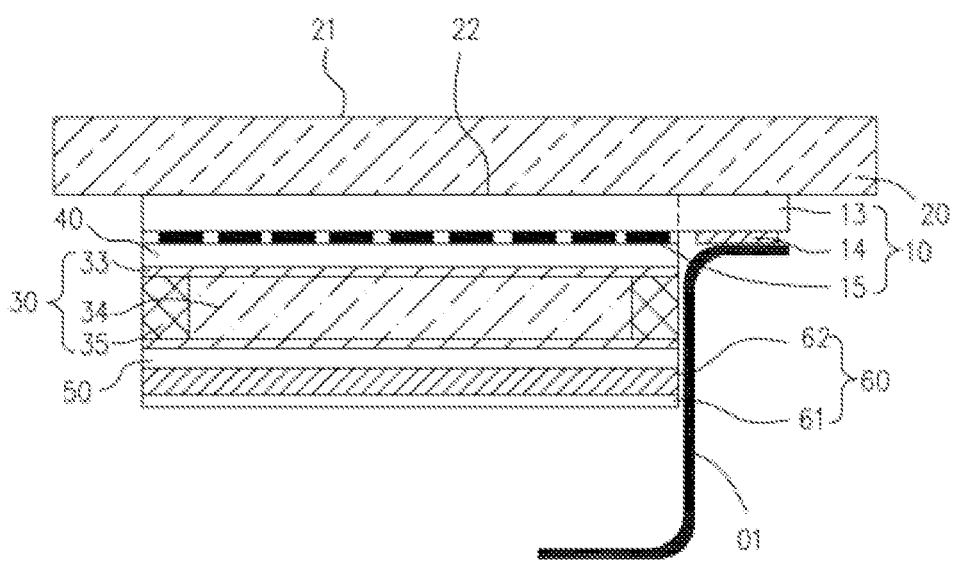
FIG. 10 is a schematic cross-sectional view of the display device according to a ninth implementation of the present disclosure.

As illustrated in FIG. 10, the display device in a ninth implementation is similar to that in the eighth implementation except that the filter substrate 62 may be attached to the second polarizer 50. The pigment layer 61 is stacked on a side of the filter substrate 62 facing away from the second polarizer 50. The light emitted from the light source of the display device sequentially passes through the pigment layer 61 and the filter substrate 62.

Figure 11:
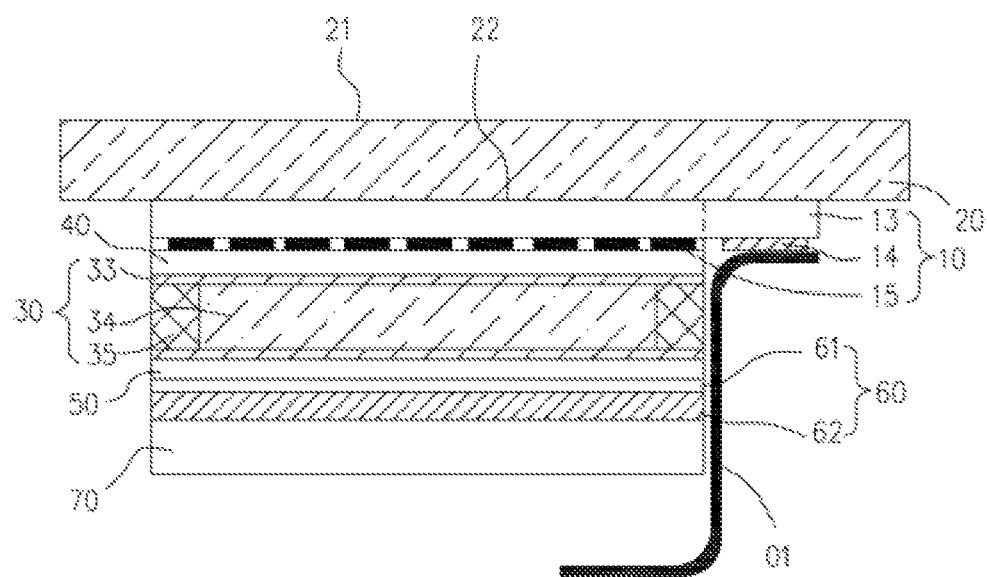
FIG. 11 is a schematic cross-sectional view of the display device according to a tenth implementation of the present disclosure.

As illustrated in FIG. 11, a display device in a tenth implementation is similar to that in the ninth implementation except that the display device in the tenth implementation further includes a backlight source 70 fixed to a side of the filter layer 60 facing away from the liquid crystal layer 30. An orthographic projection of the backlight source 70 falls on the filter layer 60.

In the implementation, the backlight source 70 includes a light guide plate and a number of light emitting diodes (LEDs) fixed to a peripheral side of the light guide plate. The light emitted from the backlight source 70 sequentially passes through the filter layer 60, the second polarizer 50, the liquid crystal layer 30, the first polarizer 40, the driving layer 10, and the protective layer 20. The second extending portion 012 of the circuit board 01 may be laminated on a side of the backlight source 70 facing away from the filter layer 60, thereby facilitating the electrical coupling between the second extending portion 012 of the circuit board 01 and the mainboard of the electronic apparatus.

Figure 12:
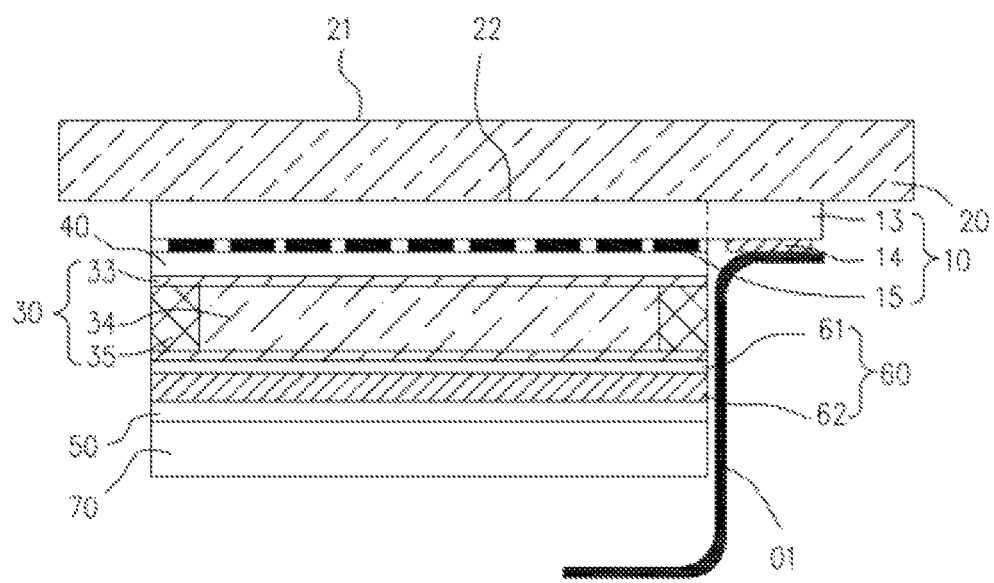
FIG. 12 is a schematic cross-sectional view of the display device according to an eleventh implementation of the present disclosure.

As illustrated in FIG. 12, a display device in an eleventh implementation is similar to that in the tenth implementation except that the filter layer 60 is attached to the liquid crystal layer 30. The second polarizer 50 is attached to the side of the filter layer 60 facing away from the liquid crystal layer 30. The light emitted from the backlight source 70 sequentially passes through the second polarizer 50, the filter layer 60, the liquid crystal layer 30, the first polarizer 40, the driving layer 10, and the protective layer 20.

Figure 13:
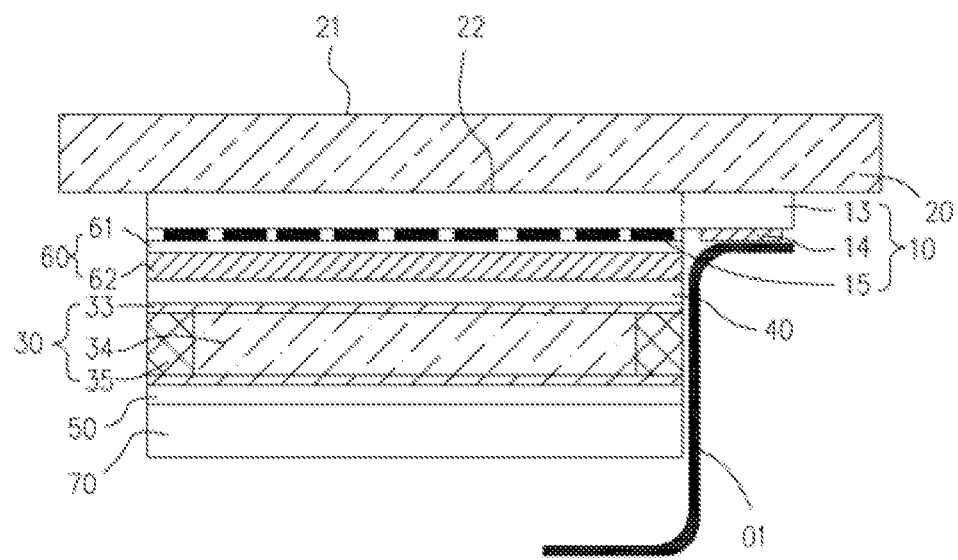
FIG. 13 is a schematic cross-sectional view of the display device according to a twelfth implementation of the present disclosure.

As illustrated in FIG. 13, a display device in a twelfth implementation is similar to that in the eleventh implementation except that the filter layer 60 is attached to the driving layer 10. The first polarizer 40 is attached to a side of the filter layer 60 facing away from the driving layer 10, and the liquid crystal layer 30 is laminated on the side of the first polarizer 40 facing away from the filter layer 60. The second polarizer 50 is attached to the side of the liquid crystal layer 30 facing away from the first polarizer 40. The backlight source 70 is attached to the side of the second polarizer 50 facing away from the liquid crystal layer 30. The light emitted from the backlight source 70 sequentially passes through the second polarizer 50, the liquid crystal layer 30, the first polarizer 40, the filter layer 60, the driving layer 10, and the protective layer 20.

Figure 14:
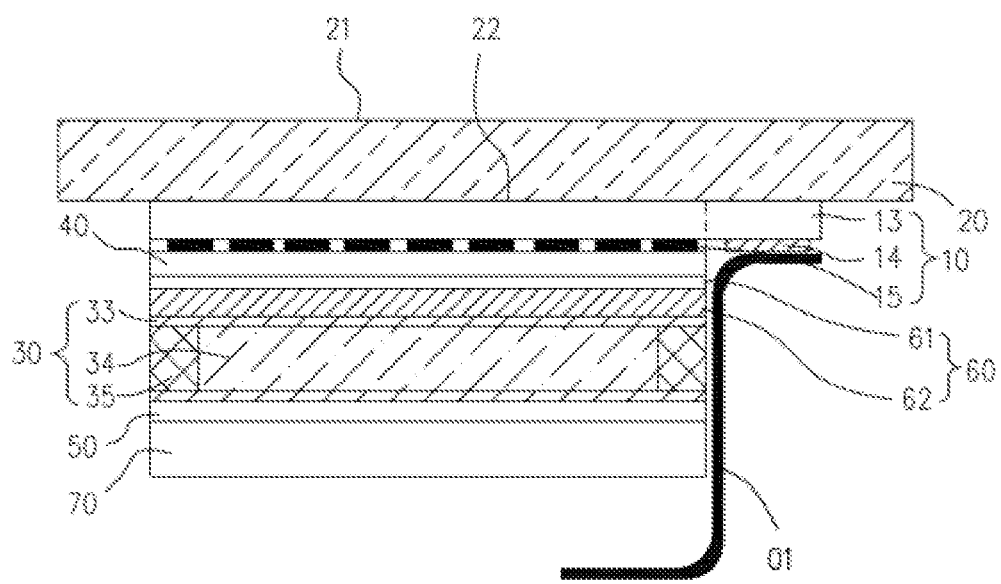
FIG. 14 is a schematic cross-sectional view of the display device according to a thirteenth implementation of the present disclosure.

As illustrated in FIG. 14, a display device in a thirteenth implementation is similar to that in the twelfth implementation except that the protective layer 20, the driving layer 10, the first polarizer 40, the filter layer 60, the liquid crystal layer 30, the second polarizer 50, and the backlight source 70 are sequentially stacked together. The light emitted from the backlight source 70 sequentially passes through the second polarizer 50, the liquid crystal layer 30, the filter layer 60, the first polarizer 40, the driving layer 10, and the protective layer 20.

Figure 15:
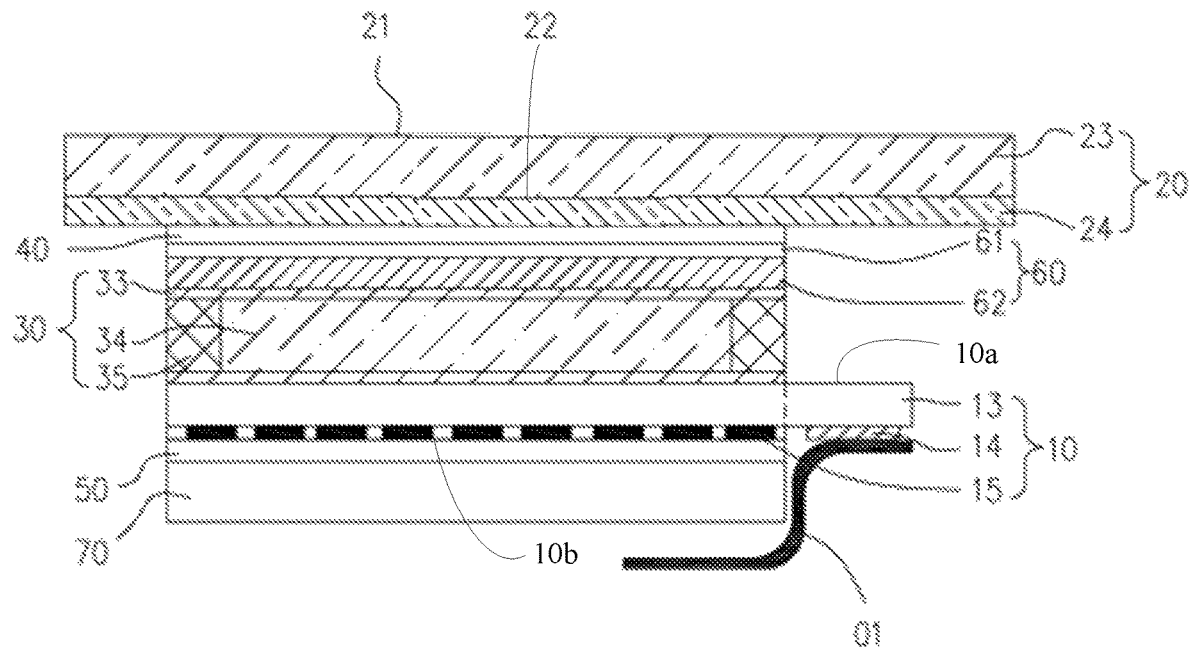
FIG. 15 is a schematic cross-sectional view of the display device according to a fourteenth implementation of the present disclosure.

As illustrated in FIG. 15, a display device in a fourteenth implementation is similar to that in the thirteenth implementation except that the liquid crystal layer 30 is stacked on the first surface 10a of the driving layer 10, and the protective layer 20, the first polarizer 40, the filter layer 60, the liquid crystal layer 30, the driving layer 10, the second polarizer 50, and the backlight source 70 are sequentially stacked. The light emitted from the backlight source 70 sequentially passes through the second polarizer 50, the driving layer 10, the liquid crystal layer 30, the filter layer 60, the first polarizer 40, and the protective layer 20.

The protective layer 20 includes a light transmission substrate 23 and a touch substrate 24 integrated into the light transmission substrate 23.

In the implementation, the light transmission substrate 23 is a glass plate. The exit light surface 21 and the incident light surface 22 are in opposite sides of the light transmission substrate 23. The light transmission substrate 23 may allow the light from the driving layer 10 to pass through. The touch substrate 24 is configured to receive touch information from the user, thereby triggering the display device to send touch instructions to the electronic apparatus.

Figure 16:
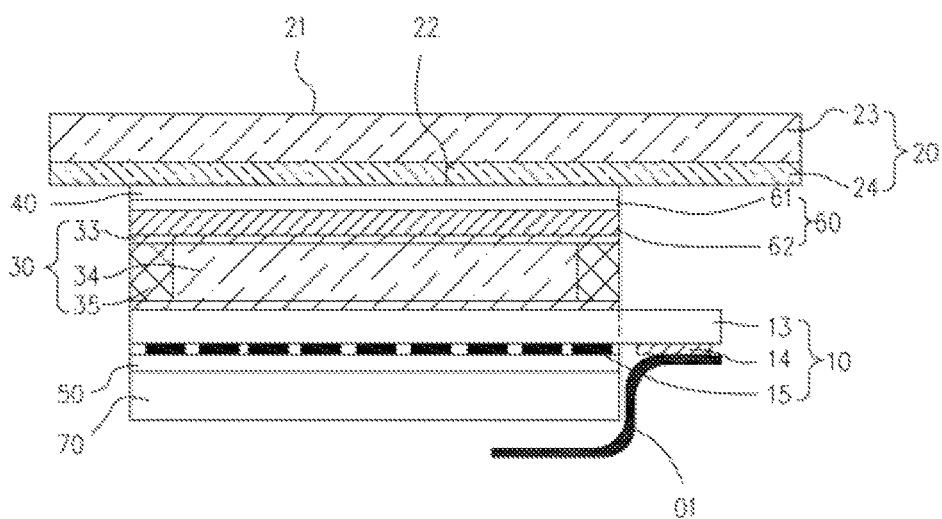
FIG. 16 is a schematic cross-sectional view of the display device according to a fifteenth implementation of the present disclosure.

As illustrated in FIG. 16, a display device in a fifteenth implementation is similar to that in the fourteenth implementation except that the exit light surface 21 is a side of the light transmission substrate 23 facing away from the touch substrate 24. The incident light surface 22 is a side of the touch substrate 24 facing away from the light transmission substrate 23.

As illustrated in FIG. 17, the present disclosure also provides the electronic apparatus 200 including the display device of the tenth implementation. It should be understood that, the display device in any one of the implementations may be applied to the electronic apparatus 200. The electronic apparatus 200 further includes a casing 81, a mainboard 82, and the circuit board 01. The display device is attached to the casing 81. The mainboard 82 and the circuit board 01 are fixed in the casing 81. The circuit board 01 is electrically coupled between the mainboard 82 and the display device.

In the implementation, the mainboard 82 is fixed in the casing 81 and located at a side of the backlight source 70 facing away from the protective layer 10. The second extending portion 012 of the circuit board 01 may be stacked on the backlight source 70. The backlight source 70 and the conductive area 12 of the driving layer 10 cooperatively cover the circuit board 01, thereby decreasing the length and the width of the display device, and increasing the screen ratio of the display device. For example, the circuit board 01 includes the first circuit surface 013 and the second circuit surface 014 disposed opposite the first circuit surface 013. The first circuit surface 013 is attached to the second surface 10b of the driving layer 10 at the first extending portion 011. The pads on the first circuit surface 013 are electrically coupled to the conductive ports 15 of the driving layer 10. After the second extending portion 012 is laminated on the mainboard 82, the second circuit surface 014 is located away from the driving layer 10. The second circuit surface 014 is configured to be attached to the mainboard 82 of the electronic apparatus 200, and the pads on the second circuit surface 014 are electrically coupled to the mainboard 82 of the electronic apparatus 200.

Figure 18:
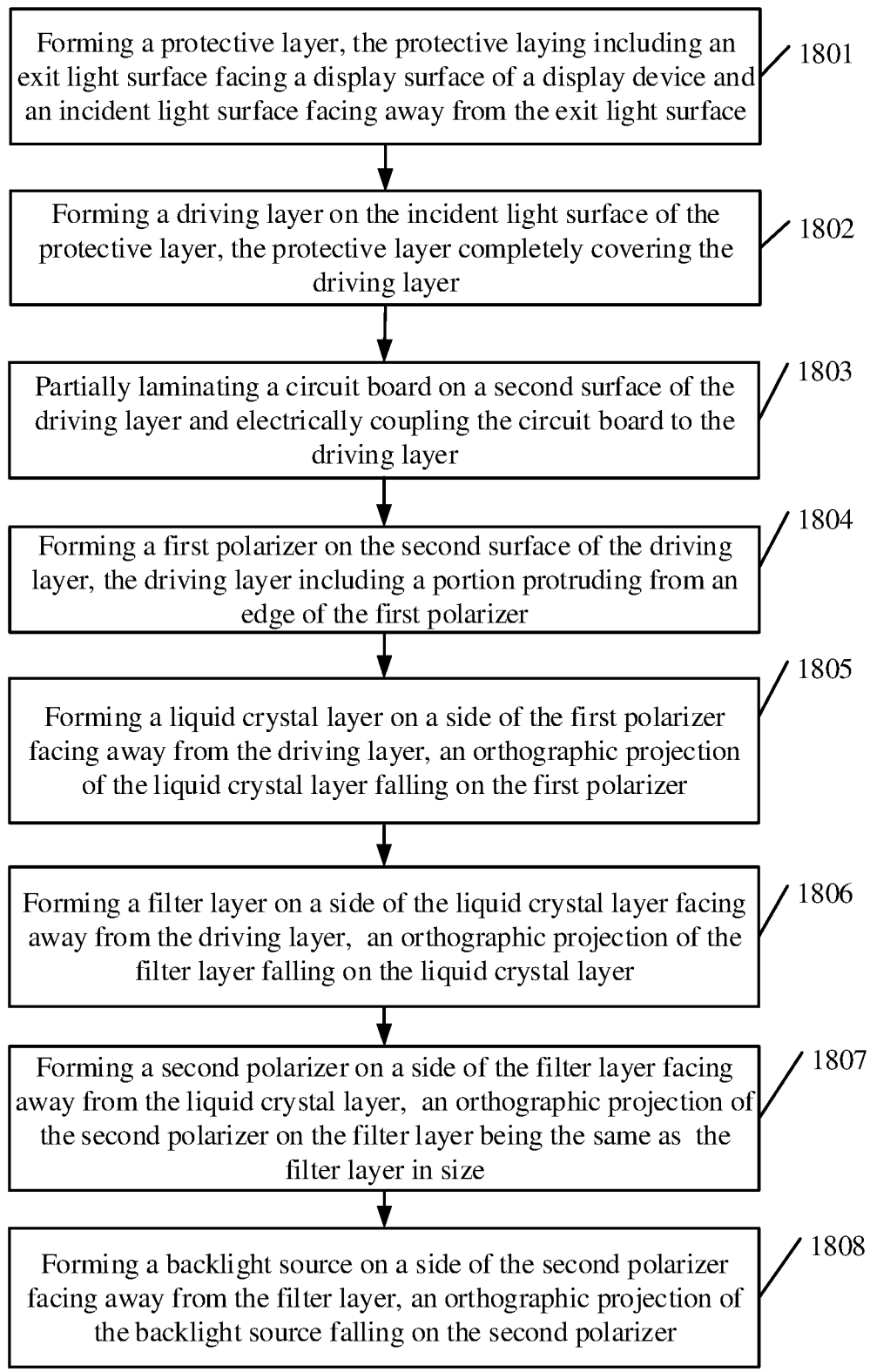
FIG. 18 is a flow chart illustrating a method for manufacturing the display device according to an implementation of the present disclosure.

As illustrated in FIG. 18, the present disclosure further provides a method for manufacturing a display device, such as the display device in the tenth implementation illustrated in FIG. 11. The method includes the following.

At block 1801, the protective layer 20 is formed. The protective layer 20 includes the exit light surface 21 and the incident light surface 22 facing away from the exit light surface 21.

In the implementation, in forming the protective layer 20, via a deposition process, the light transmission substrate 23 is formed and a touch substrate is formed on the light transmission substrate 23.

In an alternative implementation, in forming the protective layer 20, the light transmission substrate 23 may be formed via a roll forming process, and then the touch substrate 24 is formed on a side of the light transmission substrate 23 via a deposition process.

At block 1802, the driving layer 10 is formed on the incident light surface 22 of the protective layer, where the protective layer 1020 completely covers the driving layer 10.

In the implementation, the driving layer 10 is formed on the protective layer 20 via a vacuum deposition process. A driving substrate 13 is attached to the incident light surface 22 of the protective layer 20. Then, switch components 14, first data lines 161, and second data lines 162 are deposited on a switch array portion 131 of the driving substrate 13. Finally, first conductive ports 151 are assembled on a first conductive portion 132 and second conductive ports 152 are assembled on a second conductive portion 133 of the driving substrate 13. The driving layer 10 is formed via the deposition process with the protective layer 20 being used as a substrate, thereby facilitating the formation of the driving layer 10 and reducing manufacturing costs.

In an alternative implementation, the driving layer 10 is only provided with the switch components 14, the first data lines 161, the second data lines 162, and conductive port 15. In forming the driving layer 10, the switch components 14, the first data lines 161, the second data lines 162, and the conductive ports 15 are deposited directly on the incident light surface 22 of the protective layer 20.

At block 1803, the circuit board 01 is partially laminated on the second surface 10b of the driving layer 10, and the circuit board 01 is electrically coupled to the driving layer 10.

In the implementation, the first extending portion 011 of the circuit board 01 is attached to the portion of the second surface 10b of the driving layer 10 corresponding to the conductive area 12. The first extending portion 011 of the circuit board 01 may be conductive ports 15 soldered to the component layer 13a.

At block 1804, the first polarizer 40 is formed on the second surface 10b of the driving layer 10. The driving layer 10 includes the extension portion extending beyond the edge of the first polarizer 40.

In the implementation, the first polarizer 40 is attached to the driving layer 10 by an optical adhesive.

At block 1805, a liquid crystal layer 30 is formed on a side of the first polarizer 40 facing away from the driving layer 10. An orthographic projection of the liquid crystal layer 30 falls on the first polarizer 40.

In the implementation, one alignment film layer 33 is deposited on the first polarizer 40. The encapsulating adhesives 35 are formed on the alignment film layer 33. The encapsulating adhesives 35 and the alignment film layer 33 cooperatively define a space. The liquid crystals 34 are filled in the space cooperatively defined by the alignment film layer 33 and the encapsulating adhesives 35. The liquid crystals 34 are encapsulated by depositing the other alignment film layer 33 on the encapsulating adhesive 35.

At block 1806, the filter layer 60 is formed on the side of the liquid crystal layer 30 facing away from the driving layer 10. An orthographic projection of the filter layer 60 falls on the liquid crystal layer 30.

In the implementation, the filter substrate 62 is formed via a roll forming process, and then the pigment layer 61 is deposited on the filter substrate 62. Finally, the pigment layer 61 together with the filter substrate 62 is attached to the alignment film layers 33 of the liquid crystal layer 30 facing the filter layer 60.

In an alternative implementation, the filter substrate 62 may be first formed via a roll forming process, and then the filter substrate 62 is attached to the alignment film layer 33 of the liquid crystal layer 30 facing the filter layer 60, and finally the pigment layer 61 is deposited on the side of the filter substrate 62 facing away from the liquid crystal layer 30.

At block 1807, the second polarizer 50 is formed on the side of the filter layer 60 facing away from the liquid crystal layer 30. An orthographic projection of the second polarizer 50 on the filter layer 60 and the filter layer 60 are the same in size.

In the implementation, the second polarizer 50 is attached to the driving layer 10 by an optical adhesive.

At block 1808, the backlight source 70 is disposed on the side of the second polarizer 50 facing away from the filter layer 60. An orthographic projection of the backlight source 70 falls on the second polarizer 50.

In the implementation, the backlight source 70 is attached to the second polarizer 50 by an optical adhesive.

Figure 19:
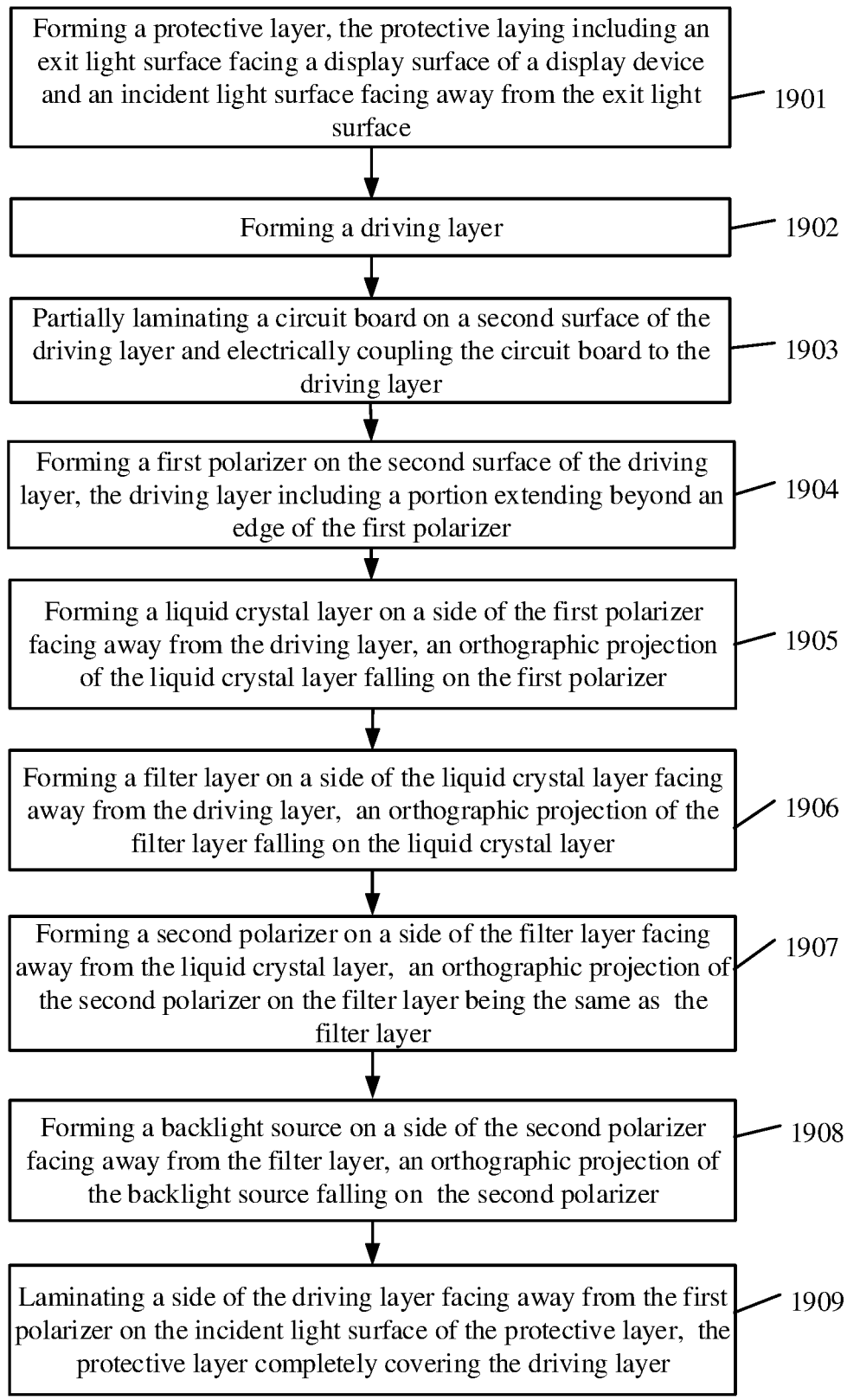
FIG. 19 is a flow chart illustrating a method for manufacturing the display device according to another implementation of the present disclosure.

As illustrated in FIG. 19, in one implementation, another method for manufacturing a display device is provided, such as the display device in the tenth implementation illustrated in FIG. 11. The method includes operations at the following blocks.

At block 1901, the protective layer 20 is formed. The protective layer 20 includes the exit light surface 21 facing the user, that is, facing a display surface of the display device or facing away from the mainboard 82 of the electronic apparatus 200, and the incident light surface 22 facing away from the exit light surface 21.

In the implementation, in forming the protective layer 20, the light transmission substrate 23 is formed and the touch substrate is formed on the light transmission substrate 23, via a deposition process.

In an alternative implementation, in forming the protective layer 20, the light transmission substrate 23 may be formed via a roll forming process, and then the touch substrate 24 is formed on the side of the light transmission substrate 23 via a deposition process.

At block 1902, the driving layer 10 is formed.

In the implementation, the driving substrate 13 is formed. The switch components 14, the first data lines 161, the second data lines 162, the first conductive ports 151, and the second conductive ports are then deposited on the driving substrate 13. The driving substrate 13 is narrower and shorter than the protective layer 20.

At block 1903, the circuit board 01 is partially laminated on the second surface 10b of the driving layer 10 and is electrically coupled to the driving layer 10.

At block 1904, the first polarizer 40 is formed on the side of the driving layer 10. The driving layer 10 includes the extension portion extending beyond the edge of the first polarizer 40.

In the implementation, the first polarizer 40 is attached to the side of the driving layer 10 where the switch components 14 are disposed by an optical adhesive.

At block 1905, the liquid crystal layer 30 is formed on the side of the first polarizer 40 facing away from the driving layer 10. An orthographic projection of the liquid crystal layer 30 falls on the first polarizer 40.

In the implementation, one alignment film layer 33 is deposited on the first polarizer 40. The encapsulating adhesives 35 are formed on the alignment film layer 33. The encapsulating adhesives 35 and the alignment film layer 33 cooperatively define a space. The liquid crystals 34 are filled in the space cooperatively defined by the alignment film layer 33 and the encapsulating adhesives 35. The liquid crystals 34 are encapsulated by depositing the other alignment film layer 33 on the encapsulating adhesives 35.

At block 1906, the filter layer 60 is formed on the side of the liquid crystal layer 30 facing away from the driving layer 10. An orthographic projection of the filter layer 60 falls on the liquid crystal layer 30.

In the implementation, the filter substrate 62 is first formed via a roll forming process, and then the pigment layer 61 is deposited on the filter substrate 62. Finally, the pigment layer 61 together with the filter substrate 62 is attached to the alignment film 33 of the liquid crystal layer 30 facing the filter layer 60.

In an alternative implementation, the filter substrate 62 may be first formed by a roll forming process, and then the filter substrate 62 is attached to the alignment film 33 of the liquid crystal layer 30 facing the filter layer 60, and finally the pigment layer 61 is deposited on a side of the filter substrate 62 facing away from the liquid crystal layer 30.

At block 1907, the second polarizer 50 is formed on the side of the filter layer 60 facing away from the liquid crystal layer 30. An orthographic projection of the second polarizer 50 on the filter layer 60 and the filter layer 60 are the same in size.

In the implementation, the second polarizer 50 is attached to the driving layer 10 by an optical adhesive.

At block 1908, the backlight source 70 is disposed at the side of the second polarizer 50 facing away from the filter layer 60. An orthographic projection of the backlight source 70 falls on the second polarizer 50.

In the implementation, the backlight source 70 is attached to the second polarizer 50 by an optical adhesive.

At block 1909, the side of the driving layer 10 facing away from the first polarizer 40 is attached to the incident light surface 22 of the protective layer 20. The protective layer 20 completely covers the driving layer 10.

In the display device, the electronic apparatus, and the method for manufacturing the display device of the present disclosure, the light incident surface of the protective layer and the driving layer overlap with each other, and the protective layer completely covers the driving layer to reinforce the driving layer. As a result, the driving layer is supported, and accordingly not easily broken, thereby enabling the display device structure to be stable and reliable.

The above disclosed are merely illustrative implementations of the present disclosure and of course may not limit the scope of the present disclosure. The skilled in art should understand all or part of the process to implement the above implementations and make equivalent modifications in accordance with the claims of the present disclosure. However, the equivalent modifications will be within the scope of the present disclosure.

What is claimed is:

1. A display device, comprising:
   a driving layer, configured to drive liquid crystals to move so as to change orientation of the liquid crystals, the driving layer comprising a first surface facing away from a mainboard of an electronic apparatus having the display device and a second surface facing away from the first surface; and
   a circuit board comprising a main portion, a first extending portion, and a second extending portion, wherein the first extending portion extends from the main portion in a first direction toward a first edge of the driving layer, the second extending portion extends from the main portion in a second direction toward a second edge of the driving layer opposite to the first edge, the first extending portion is laminated on the second surface and electrically coupled to the driving layer, and the second extending portion is electrically coupled to the mainboard and is laminated on a surface of the mainboard facing the second surface of the driving layer.

2. The display device of claim 1, wherein:
   the driving layer comprises a driving substrate and a component layer stacked on the driving substrate;
   the first surface is a surface of the driving substrate facing away from the component layer;
   the second surface is a surface of the component layer facing away from the driving substrate; and
   the component layer comprises a plurality of switch components and a plurality of conductive ports, wherein the plurality of switch components are configured to drive the liquid crystals to move so as to change orientation of the liquid crystals, and wherein the plurality of conductive ports are electrically coupled to the plurality of switch components and the circuit board.

3. The display device of claim 1, further comprising a protective layer stacked on the first surface of the driving layer and completely covering the driving layer.

4. The display device of claim 1, further comprising a liquid crystal layer stacked on the second surface of the driving layer facing away from the first surface,
   wherein the second surface comprises an extension portion extending beyond an edge of the liquid crystal layer; and
   the circuit board is partially laminated on the extension portion of the second surface extending beyond the edge of the liquid crystal layer.

5. The display device of claim 4, further comprising a first polarizer fixed between the liquid crystal layer and the driving layer.

6. The display device of claim 5, further comprising a second polarizer fixed to a side of the liquid crystal layer facing away from the first polarizer.

7. The display device of claim 4, wherein the liquid crystal layer comprises two alignment film layers, the liquid crystals, and encapsulating adhesives, wherein the liquid crystals are disposed between the two alignment film layers, and wherein the encapsulating adhesives encapsulate the liquid crystals, and form edges of the liquid crystal layer.

8. The display device of claim 4, further comprising a filter layer stacked on a side of the liquid crystal layer facing away from the driving layer, wherein an orthographic projection of the filter layer falls on the liquid crystal layer.

9. The display device of claim 8, wherein the filter layer comprises a pigment layer stacked on the liquid crystal layer and a filter substrate stacked on a side of the pigment layer facing away from the liquid crystal layer.

10. The display device of claim 8, further comprising a backlight source fixed to a side of the filter layer facing away from the liquid crystal layer, wherein an orthographic projection of the backlight source falls on the filter layer.

11. The display device of claim 1, further comprising a liquid crystal layer stacked on the first surface of the driving layer,
wherein the second surface of the driving layer comprises an extension portion extending beyond an edge of the liquid crystal layer; and
the circuit board is partially laminated on the extension portion of the second surface beyond the edge of the liquid crystal layer.

12. The display device of claim 11, further comprising a protective layer, a first polarizer, and a filter layer sequentially stacked on the liquid crystal layer.

13. The display device of claim 12, further comprising a second polarizer and a backlight source, wherein the second polarizer is stacked on the second surface of the driving layer and the backlight source is stacked on the second polarizer.

14. The display device of claim 12, wherein the protective layer comprises a light transmission substrate and a touch substrate attached to the light transmission substrate, an exit light surface of the protective layer is located at a side of the light transmission substrate facing away from the touch substrate, and an incident light surface of the protective layer is located at a side of the touch substrate facing away from the light transmission substrate.

15. An electronic apparatus, comprising:
a casing;
a mainboard fixed in the casing;
a display device attaching to the casing and comprising a driving layer configured to drive liquid crystals to move so as to change orientation of the liquid crystals, wherein the driving layer comprises a first surface facing away from the mainboard and a second surface facing towards the mainboard; and
a circuit board comprising a main portion, a first extending portion, and a second extending portion, wherein the first extending portion extends from the main portion in a first direction toward a first edge of the driving layer, the second extending portion extends from the main portion in a second direction toward a second edge of the driving layer opposite to the first edge, the first extending portion is laminated on the second surface and electrically coupled to the driving layer, the circuit board is further electrically coupled to the mainboard and the second extending portion of the circuit board is laminated on a surface of the mainboard facing the second surface of the driving layer.

16. The electronic apparatus of claim 15, further comprising a liquid crystal layer stacked on the second surface of the driving layer,
wherein the second surface comprises an extension portion extending beyond an edge of the liquid crystal layer; and
the circuit board is partially laminated on the extension portion of the second surface extending beyond the edge of the liquid crystal layer.

17. The electronic apparatus of claim 15, further comprising a liquid crystal layer stacked on the first surface of the driving layer,
wherein the second surface of the driving layer comprises an extension portion extending beyond an edge of the liquid crystal layer; and
the circuit board is partially laminated on the extension portion of the second surface beyond the edge of the liquid crystal layer.

18. A method for manufacturing a display device, comprising:
forming a driving layer, the driving layer comprising a first surface facing away from a mainboard of an electronic apparatus having the display device and a second surface facing away from the first surface; and
partially laminating a first extending portion of a circuit board on the second surface of the driving layer and electrically coupling the circuit board to the driving layer, wherein the circuit board further comprises a main portion, and a second extending portion, wherein the first extending portion extends from the main portion in a first direction toward a first edge of the driving layer, and the second extending portion extends from the main portion in a second direction toward a second edge of the driving layer opposite to the first edge, wherein the second extending portion of the circuit board is laminated on a surface of the mainboard facing the second surface of the driving layer.

19. The method of claim 18, further comprising:
forming a liquid crystal layer on one of the first surface of the driving layer or the second surface of the driving layer.

* * * * *